United States Patent
Yoon et al.

(10) Patent No.: US 7,570,338 B2
(45) Date of Patent: Aug. 4, 2009

(54) LCD PANEL AND FABRICATING METHOD WITH BALL SPACER WITHIN DUMMY SOURCE/DRAIN ELECTRODE PATTERN AND DUMMY SEMICONDUCTOR PATTERN OVER GATE LINE FOR MAINTAINING CELL GAP

(75) Inventors: Sung Hoe Yoon, Gyeonggi-do (KR); Se Jong Shin, Daegu (KR); Bong Chul Kim, Daegu (KR); Seung Hyun Lee, Seoul (KR); Kyo Yong Koo, Gyeongsangbuk-do (KR); Hyeon Jin Seo, Gyeonsangbuk-do (KR); Dhang Kwon, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 620 days.

(21) Appl. No.: 11/436,636

(22) Filed: May 19, 2006

(65) Prior Publication Data

US 2006/0281211 A1  Dec. 14, 2006

(30) Foreign Application Priority Data

Jun. 14, 2005  (KR) .................... 10-2005-0050951

(51) Int. Cl.
*G02F 1/1339* (2006.01)
(52) U.S. Cl. ...................................... 349/155
(58) Field of Classification Search .......... 349/155–157
See application file for complete search history.

(56) References Cited

U.S. PATENT DOCUMENTS

| 6,211,937 | B1 * | 4/2001 | Miyachi et al. | 349/156 |
| 6,967,703 | B2 * | 11/2005 | Nam et al. | 349/153 |
| 2005/0140892 | A1 * | 6/2005 | Kim et al. | 349/139 |

* cited by examiner

*Primary Examiner*—David Nelms
*Assistant Examiner*—John Heyman
(74) *Attorney, Agent, or Firm*—Holland & Knight LLP

(57) ABSTRACT

A liquid crystal display panel includes an upper substrate, a lower substrate facing the upper substrate, a gate line and a data line on an upper surface of the lower substrate facing the upper substrate, the gate line and the data line cross each other to define a cell area, a pixel electrode formed in the cell area, a dummy source/drain electrode pattern over the gate line, and a ball spacer within the dummy source/drain electrode pattern, the ball spacer maintaining a cell gap between the upper substrate and the lower substrate.

25 Claims, 11 Drawing Sheets

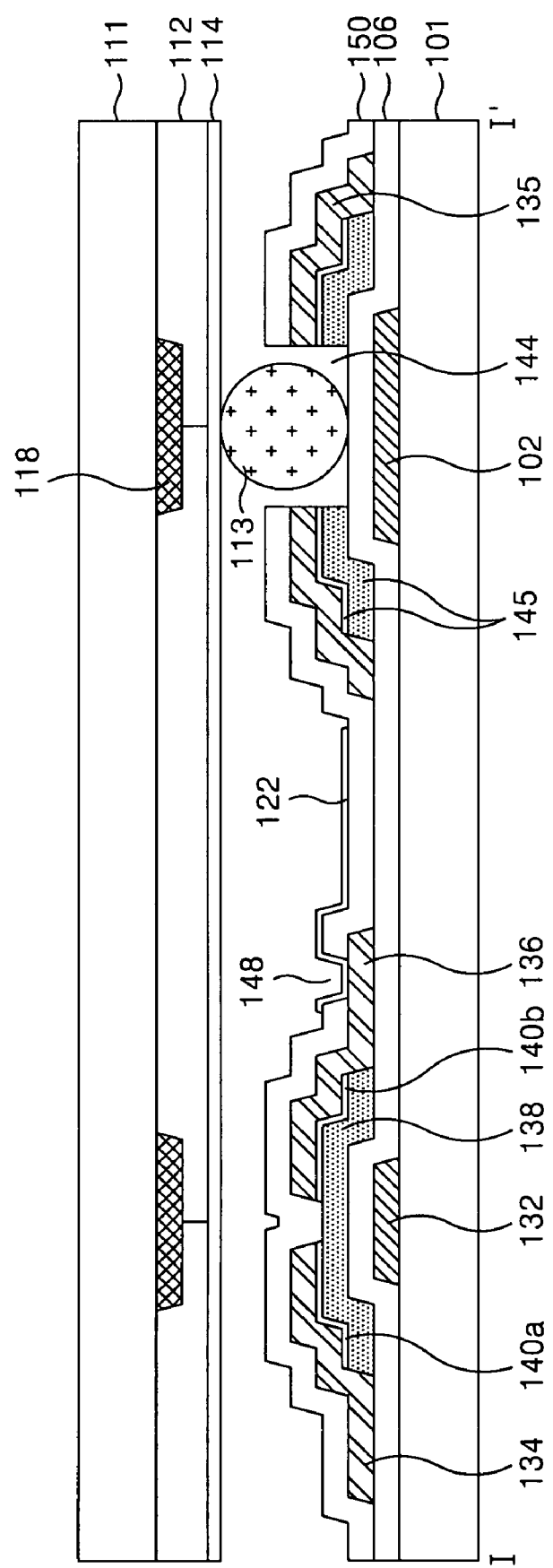

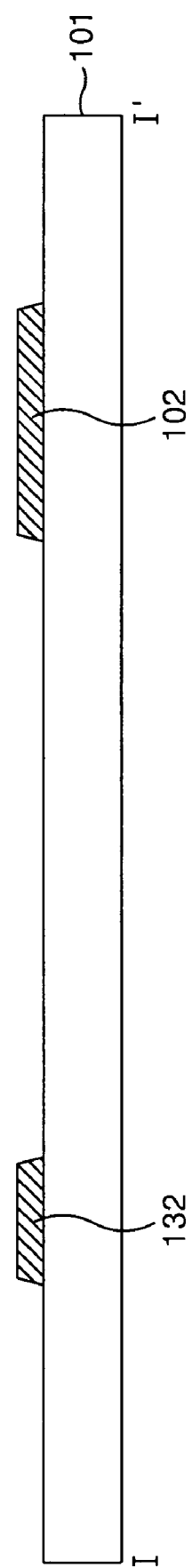

LCD PANEL AND FABRICATING METHOD WITH BALL SPACER WITHIN DUMMY SOURCE/DRAIN ELECTRODE PATTERN AND DUMMY SEMICONDUCTOR PATTERN OVER GATE LINE FOR MAINTAINING CELL GAP

This application claims the benefit of the Korean Patent Application No. P2005-0050951 filed on Jun. 14, 2005 which is hereby incorporated by reference.

BACKGROUND OF THE INVENTION

1. Field of the Invention

The present invention relates to a display panel, and more particularly to a liquid crystal display panel and a fabricating method thereof. Although the present invention is suitable for a wide scope of applications, it is particularly suitable for preventing a ball spacer in the liquid crystal display panel from moving, and a fabricating method thereof.

2. Description of the Related Art

Generally, a liquid crystal display panel controls the light transmittance of an arrangement of liquid crystal molecules by use of electric field, thereby displaying a picture. FIG. 1 is a perspective plan view of a liquid crystal display panel according to the related art. The liquid crystal display panel, as shown in FIG. 1, includes a thin film transistor substrate 70 and a color filter substrate 80 that face each other with a layer of liquid crystal molecules 16 therebetween.

The color filter substrate 80 has a color filter array 12 of R, G and B filters for realizing color formed on an upper substrate 11. The color filter substrate 80 also includes a black matrix 18 for preventing light leakage between the color filters 12. A common electrode 14 is formed on the color filter array 12. An upper alignment film (not shown) can be formed on the common electrode 14 to provide initial alignment to the liquid crystal molecules 16.

Thin film transistor substrate 70 has a thin film transistor array formed on the lower substrate 1, including a gate line 2 and a data line 4 that cross each other, and a thin film transistor 30 formed in adjacent to the crossing of the gate and data lines 2 and 4. The thin film transistor array also includes a pixel electrode 22 connected to the thin film transistor 30. A lower alignment film (not shown) can be formed over the thin film transistor array to provide initial alignment to the liquid crystal molecules 16. The orientation of liquid crystal molecules is can be controlled by way an electric field between the common electrode 14 on the upper substrate 11 and the pixel electrode 22 on the lower substrate 1.

FIG. 2 is a cross-sectional view of a ball spacer that maintains a cell gap between a color filter substrate and a thin film transistor substrate according to the related art. As shown in FIG. 2, a ball spacer 13 maintains the cell gap between the color filter substrate 80 and the thin film transistor substrate 70. The ball spacer 13 is on either the gate line 2 or the data line (not shown) that is overlapped by the black matrix 18. The ball spacer 13 can be formed by using an ink jetting method.

Because the ball spacer 13 has a globular shape, the ball spacer 13 may move about the liquid crystal display panel as a result of an impact applied to the liquid crystal display panel from the outside. For example, the ball spacer 13 can be moved to a position other than its initially deposited position by an impact applied to the liquid crystal display panel during a process of sticking polarizers to the external surfaces of the lower substrate 1 and the upper substrate 11. In another example, the ball spacer 13 can be moved about due to a vibration/impact test, which is one of the reliability tests for liquid crystal display panels.

An out of position ball spacer 13 may cause light leakage by interfering with the control of liquid crystal molecules 16. A bright spot occurs in the liquid crystal display panel where such light leakage. The bright spot becomes a cause of a defect. Further, in the case of dislocated ball spacer 13 being positioned on the pixel electrode 22, i.e. in the display area, the aperture ratio decreases.

SUMMARY OF THE INVENTION

Accordingly, the present invention is directed to a liquid crystal display panel and a fabricating method thereof that substantially obviate one or more of the problems due to limitations and disadvantages of the related art.

An object of the present invention is to provide a liquid crystal display panel in which the ball spacer is prevented from moving about.

Another object of the present invention is to provide a fabricating method of a liquid crystal display panel in which the ball spacer is prevented from moving about.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, a liquid crystal display panel according to an aspect of the present invention includes an upper substrate, a lower substrate facing the upper substrate, a gate line and a data line on an upper surface of the lower substrate facing the upper substrate, the gate line and the data line cross each other to define a cell area, a pixel electrode formed in the cell area, a dummy source/drain electrode pattern over the gate line, a ball spacer within the dummy source/drain electrode pattern, the ball spacer maintaining a cell gap between the upper substrate and the lower substrate.

In another aspect, a liquid crystal display panel includes an upper substrate, a lower substrate facing the upper substrate, a gate line and a data line on an upper surface of the lower substrate facing the upper substrate, the gate line and the data line cross each other to define a cell area, a pixel electrode formed in the cell area, a dummy semiconductor pattern over the gate line, and a ball spacer within the dummy semiconductor pattern, the ball spacer maintaining a cell gap between the upper substrate and the lower substrate.

In a further aspect, a fabricating method of a liquid crystal display panel includes forming a gate line and a data line on an upper surface of the lower substrate, the gate line and the data line cross each other to define a cell area, forming a pixel electrode formed in the cell area, forming a first dummy pattern while forming a thin film transistor over the gate line, forming a ball spacer within the first dummy pattern, and bonding an upper substrate to the lower substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 4 is a cross-sectional diagram of a liquid crystal display panel inclusive of a thin film transistor substrate taken along line I-I';

FIGS. 5A to 5E are cross-sectional diagrams of a fabricating method of a thin film transistor step by step according to an embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
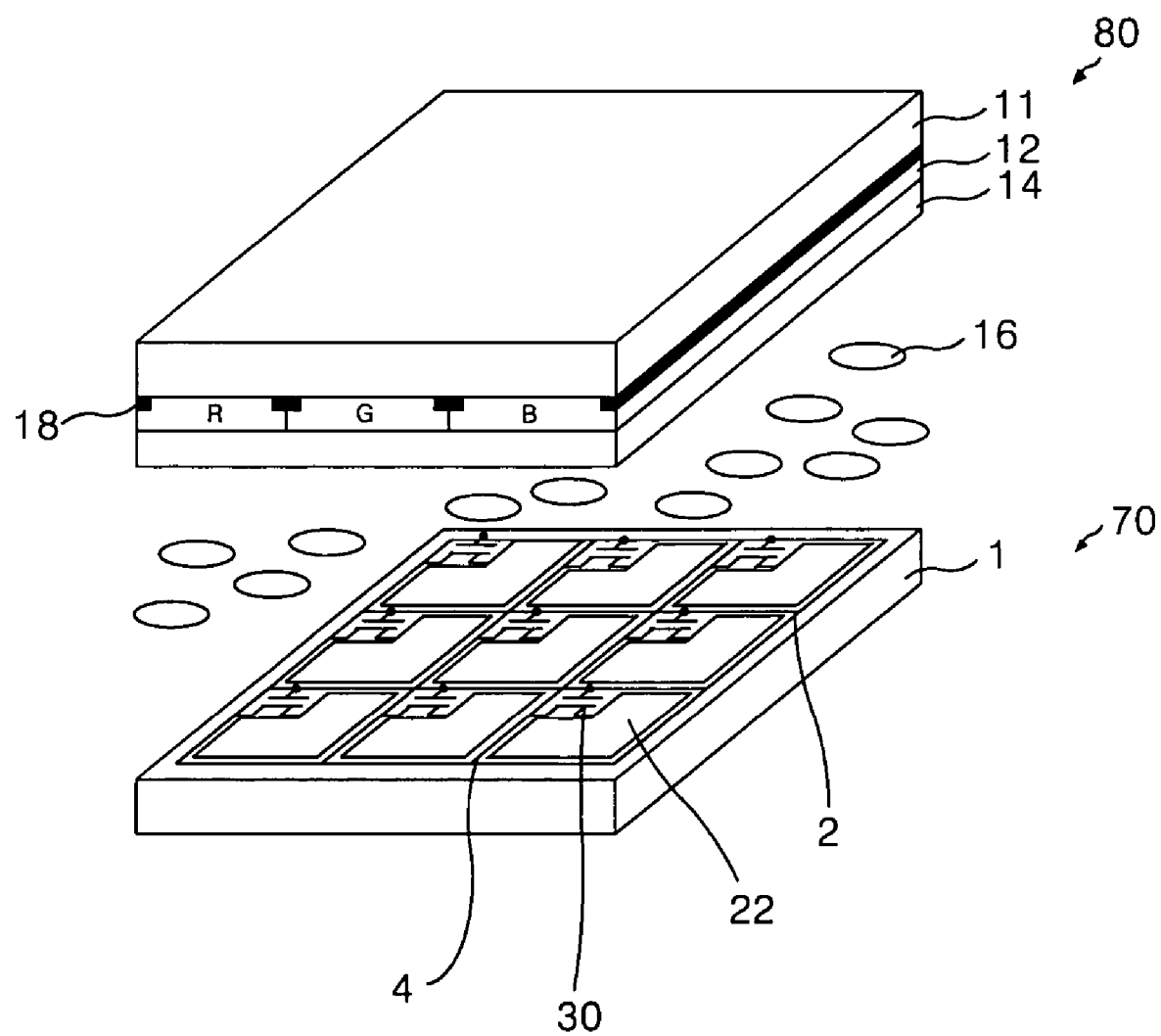
FIG. 1 is a perspective plan view of a liquid crystal display panel according to the related art.
Figure 2:
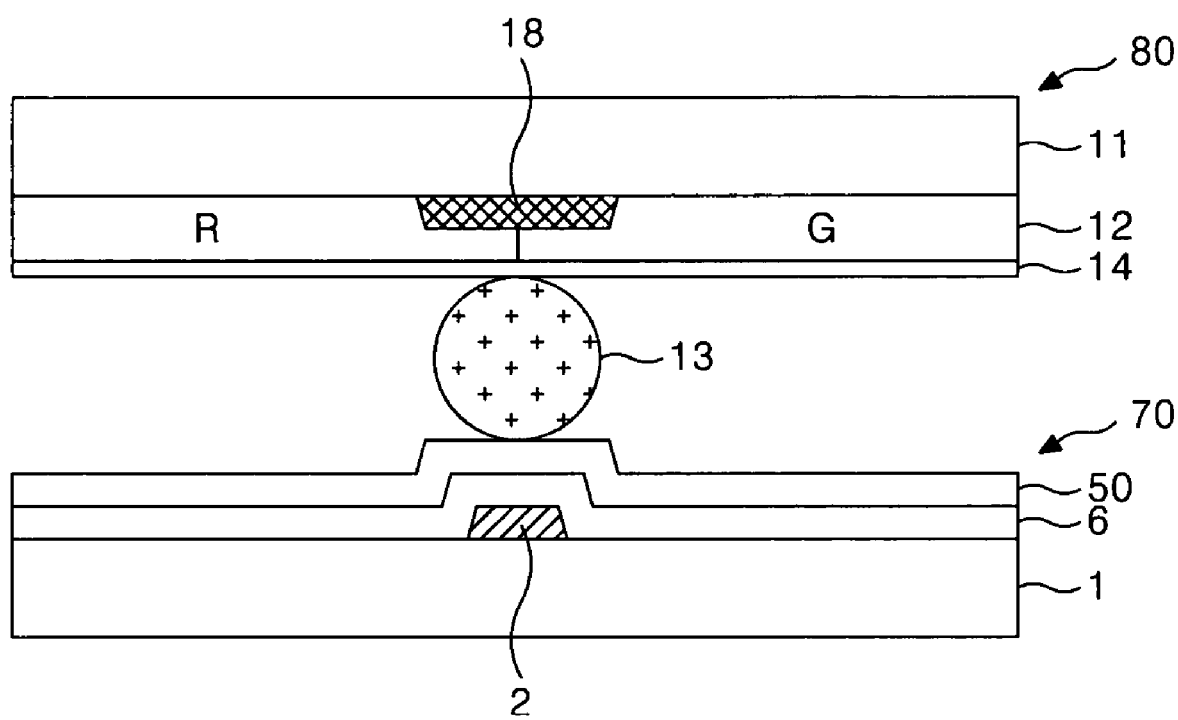
FIG. 2 is a cross-sectional view of a ball spacer that maintains a cell gap between a color filter substrate and a thin film transistor substrate according to the related art.
Figure 3:
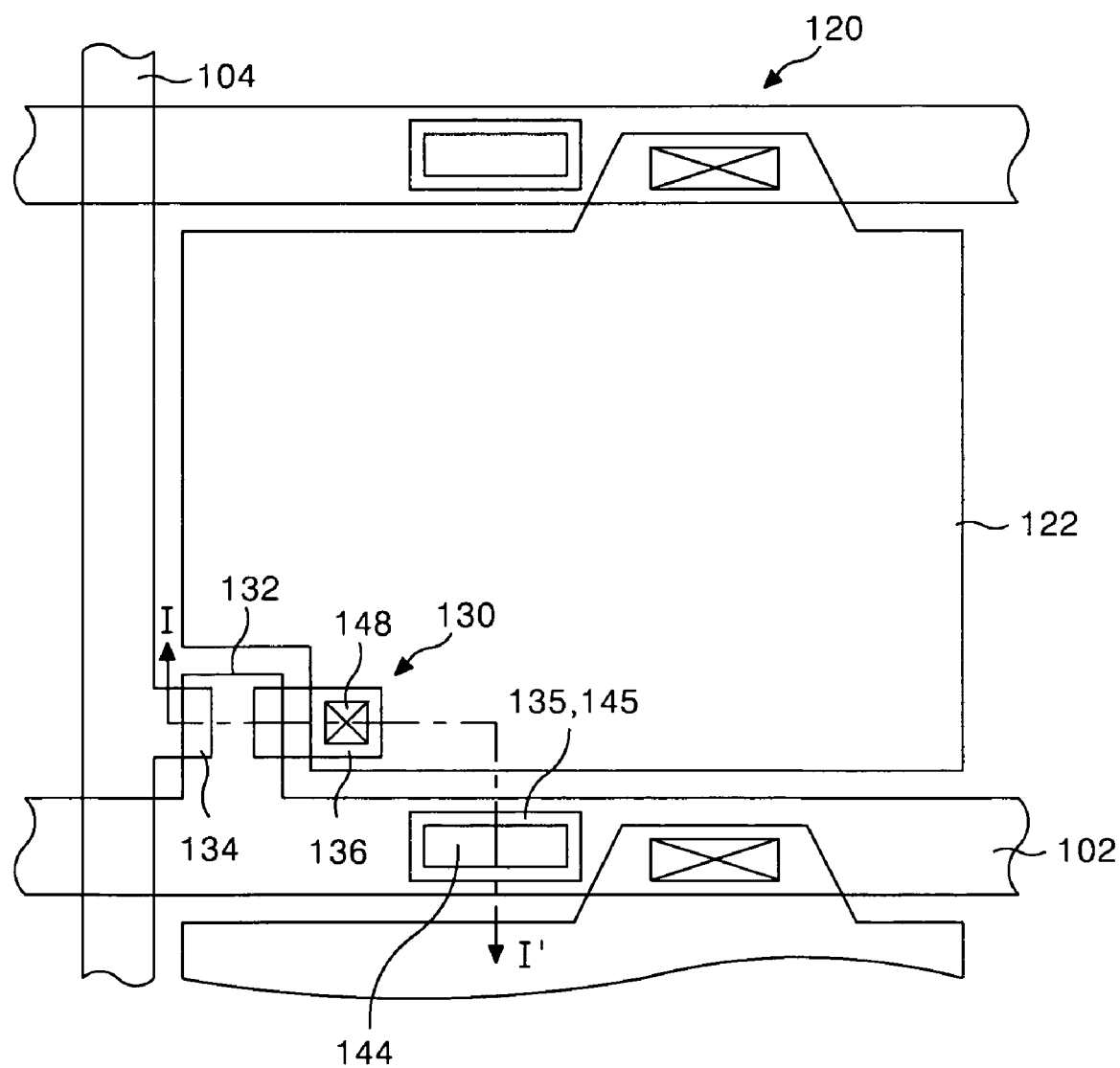
FIG. 3 is a plan view of a thin film transistor substrate according to an embodiment of the present invention.

FIG. 3 is a plan view of a thin film transistor substrate according to an embodiment of the present invention, and FIG. 4 is a cross sectional diagram representing a liquid crystal display panel inclusive of a thin film transistor substrate taken along line I-I' shown in FIG. 3. As shown in FIG. 4, a color filter substrate of the liquid crystal display panel according to the embodiment of the present invention includes a black matrix 118, which is formed corresponding to the gate line 102 and the data line 104 on the thin film transistor substrate, to define a cell area; a color filter 112 for realizing color in the cell area defined by the black matrix 118; and a common electrode 114 forming a vertical electric field with a pixel electrode 122.

A thin film transistor (hereinafter, referred to as "TFT") substrate of the liquid crystal display panel includes a gate line 102 and a data line 104 on an upper surface of the lower substrate 101 facing the color filter substrate. The gate line 102 and the data line 104 cross each other with a gate insulating film 106 therebetween to define a cell area. A thin film transistor 130 is formed at the crossing of the gate and data lines 102 and 104. A pixel electrode 122 is formed in the cell area defined by the crossing of the gate line 102 and the data line 104. The TFT substrate also includes a storage capacitor 120 overlapping a part of a gate line 102 for an adjacent cell area.

The TFT 130 supplies a pixel signal of the data line 104 to the pixel electrode 122 in response to a gate signal of the gate line 102. The TFT 130 includes a gate electrode 132 connected to the gate line 102, a source electrode 134 connected to the data line 104, a drain electrode 136 connected to the pixel electrode 122, and an active layer 138 that overlaps the gate electrode 132 and forms a channel between the source electrode 134 and the drain electrode 136. An ohmic contact layer 140a forms an ohmic contact between the active layer 138 and the source electrode 134. An ohmic contact layer 140b forms an ohmic contact between the active layer 138 and the drain electrode 136.

The liquid crystal display panel according to embodiments of the present invention includes a ball spacer 113 for keeping a cell gap between the color filter substrate and the thin film transistor substrate. The ball spacer 113 is formed by using of ink jetting method or the like. The ball spacer 113 is positioned over the gate line 102 and overlapped by a black matrix 118. The liquid crystal display panel according to the embodiments of the present invention can also include a dummy semiconductor pattern 145 and a dummy source/drain electrode pattern 135 for preventing the movement of the ball spacer 113 positioned on the gate line 102 of the lower substrate.

The dummy semiconductor pattern 145 and the dummy source/drain electrode pattern 135 are formed in a shape of well having a space that can hold the ball spacer 113, and the ball spacer 113 is formed to be placed within the inner space of the dummy source/drain 135 and the dummy semiconductor pattern 145, i.e., the spacer well 144. The ball spacer 113 is held within the dummy semiconductor pattern 145 and the dummy source/drain electrode pattern 135 after the upper substrate 111 and the lower substrate 101 are bonded together. Accordingly, the ball spacer 113 can not move about the liquid crystal display device due to the dummy source/drain electrode pattern 135 and the dummy semiconductor pattern 145 houses or retains the ball spacer 113, even if an external force is applied during further manufacturing of the liquid crystal display panel. As a result, it is possible to prevent light leakage and the reduction of the aperture ratio of the liquid crystal display panel caused by a moving or out of position ball spacer 113.

Figure 5B:
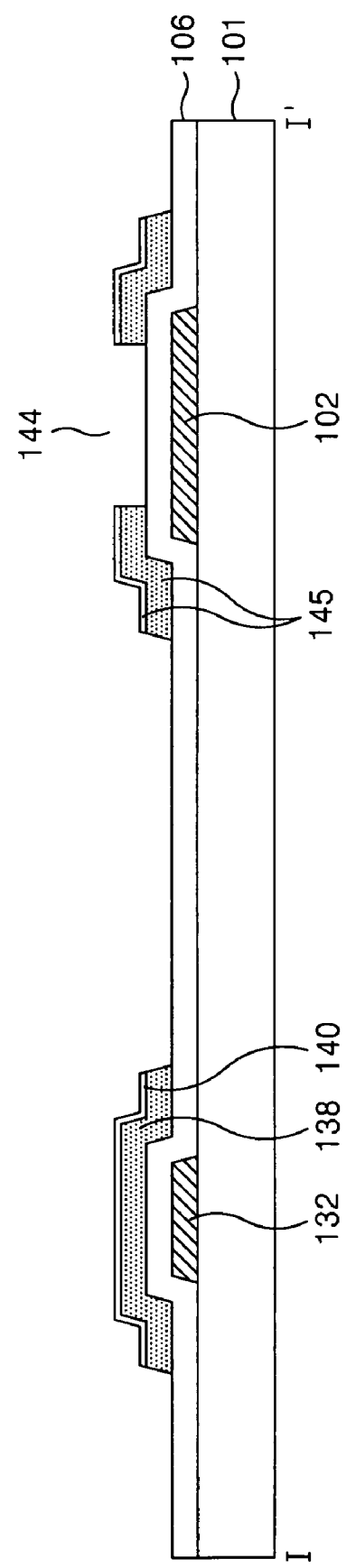

FIGS. 5A to 5E are cross-sectional diagrams of a fabricating method of a thin film transistor step by step according to an embodiment of the present invention. As shown in FIG. 5A, the gate line 102 and the gate electrode 132 are formed on the lower substrate 101 by using a first mask process. That is, a gate metal layer is formed by a deposition method, such as a sputtering method. Subsequently, the gate metal layer is patterned by a photolithography process using the first mask and by an etching process, thereby forming the gate line 102 and the gate electrode 132. The gate metal layer can be made of an aluminum group metal having aluminum (Al) or aluminum/neodymium (AL/Nd).

Subsequently, a gate insulating film 106 is deposited over the entire surface of the lower substrate 101 on which the gate line 102 and the gate electrode 132 are formed. As shown in FIG. 5B, a second mask process forms the active layer 138 and the ohmic contact layer 140 on the gate insulating film 106 as well as the dummy semiconductor pattern 145 on the gate line 102 of the lower substrate 101 where the ball spacer 113 is to be located when the upper substrate 111 and the lower substrate 101 are bond together. More specifically, the dummy semiconductor pattern 145 is shaped to form a spacer well 144, which can house/hold the ball spacer 113 therewithin.

The second mask process is started by sequentially forming first and second active layers on the gate insulating film 106 by a deposition method, such as PECVD or sputtering. A photo-resist film is then formed on the second active layer. Further, a photo-resist pattern is formed on the photo-resist film using a second mask. The active layer 138, the ohmic contact layer 140 and the dummy semiconductor pattern 145 are formed by a wet etching process using the photo-resist pattern as a mask. The active layer is made of amorphous silicon, which is doped with n-type or p-type impurities, and the ohmic contact layer is made of undoped amorphous silicon.

Figure 5C:
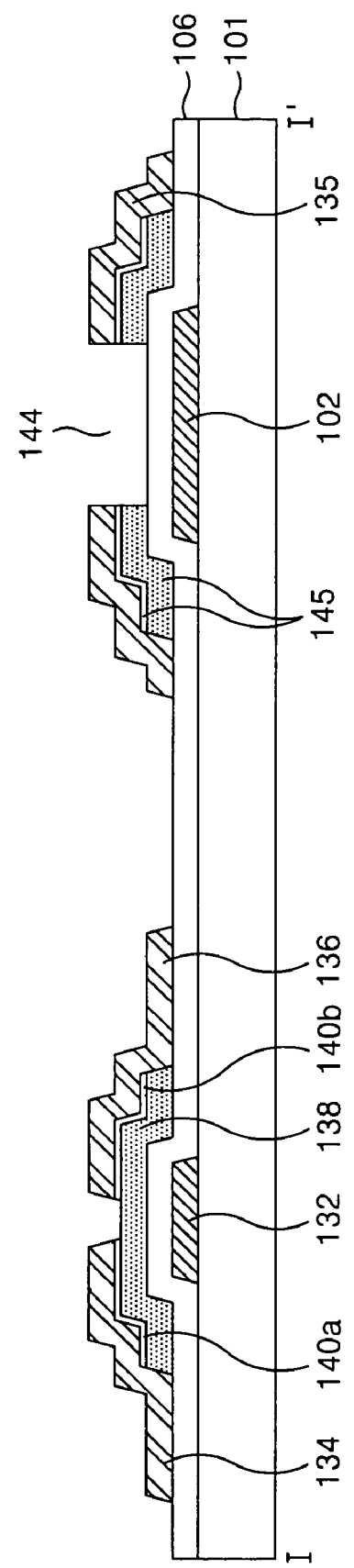

Next, a dummy source/drain electrode pattern 135 overlapping the dummy semiconductor pattern 145 and the source and drain electrodes 134 and 136 are formed by using a third mask process, on the lower substrate 101 where the active layer 138, the ohmic contact layer 140 and the dummy semiconductor pattern 145 are already formed, as shown in FIG. 5C. The third mask process is started by depositing a source/drain metal layer on the lower substrate 101 already having the active layer 138, the ohmic contact layer 140 and the dummy semiconductor pattern 145 using a deposition method, such as PECVD or sputtering. Then, a photo-resist film is deposited on the source/drain metal layer. Further, a photo-resist pattern is formed by using a third mask.

Figure 5D:
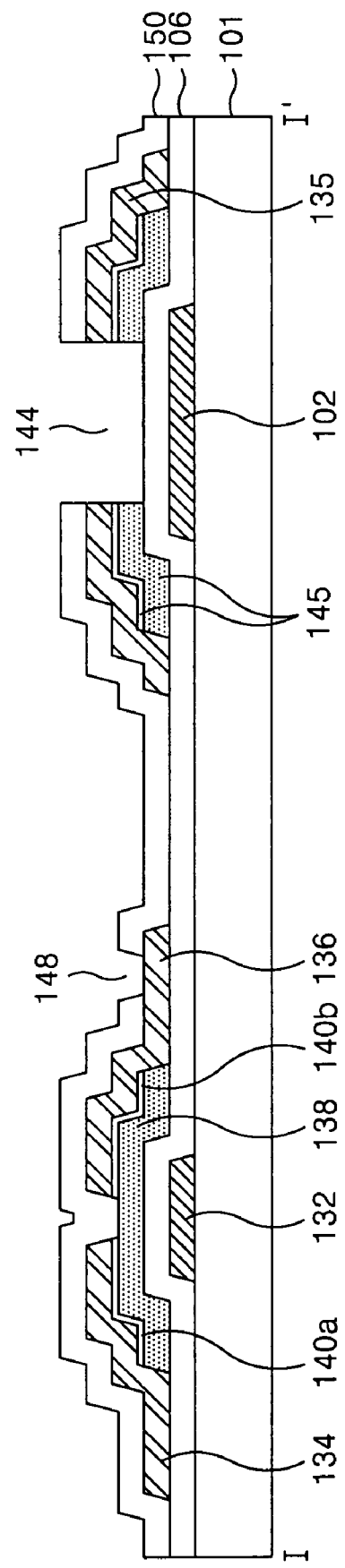
Figure 5E:
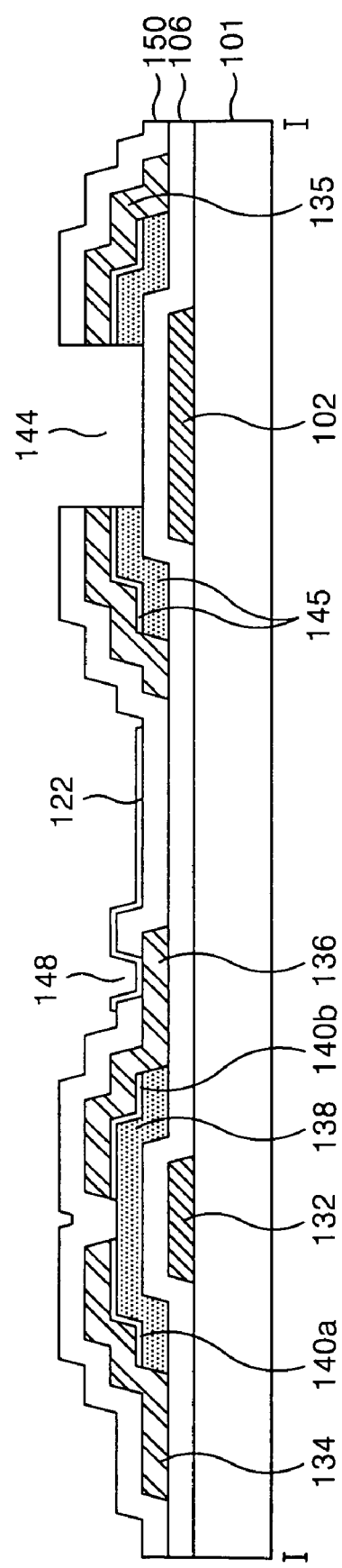

The source/drain metal layer is patterned by a wet etching process using the photo-resist pattern as a mask to form the data line 104, the source electrodes 134 connected to the data line 104, drain electrodes 136, and the dummy source/drain electrode pattern 135 on the dummy semiconductor pattern 145. Subsequently, a portion of the ohmic contact layer 140 and the source/drain metal layer are removed by the etching process to expose the active layer 138 of the channel part of the TFT 130, and the source electrode 134 and the drain electrode 136 are separated as well as the first and second ohmic contact layers 140a and 140b. The source/drain metal layer can be formed of metal, such as molybdenum (Mo), copper (Cu), etc. Subsequently, an inorganic insulating material or an organic insulating material is formed over the entire surface of the lower substrate 101 on which the source electrode 134, the drain electrode 136 and the dummy source/drain electrode pattern 145 are formed, thereby forming a passivation film 150, as shown in FIG. 5D. The passivation film 150 is patterned by a photolithography process using a fourth mask and an etching process, thereby forming a contact hole 148 that exposes the drain electrode 136.

The fifth mask process is started by sequentially forming a transparent metal film and a photo-resist film on the patterned passivation film 150 by a deposition method, such as sputtering. Then, the pixel electrode 122 is patterned by using a fifth mask. The pixel electrode 122 is in contact with the drain electrode 136 exposed through a contact hole 148. The transparent metal film can be formed of one of indium tin oxide (ITO), tin oxide (TO), indium tin zinc oxide (ITZO) and indium zinc oxide (IZO).

According to the fabricating method of the liquid crystal display panel according to the embodiment of the present invention as described above, the source and drain electrodes 134 and 136 and the dummy source/drain electrode pattern 135 are formed in the third mask process, which is conducted after the second mask process in which the active layer 138, the ohmic contact layer 140 and the dummy semiconductor pattern 145 are formed. Therefore, in the above embodiment, the total manufacturing process of the lower substrate comprises five mask processes. However, the source electrode 134 and drain electrode 136 with the active layer 138 and the ohmic contact layer 140 can be formed with the dummy source/drain electrode pattern 135 and the dummy semiconductor pattern 145 in the same mask process by using a half-tone mask. That is, the second mask process and the third mask process of the above mentioned embodiment can be performed in one mask process by using a half-tone mask. Therefore, the liquid crystal display panel in embodiments of the present invention can be fabricated using a four mask process.

Figure 6:
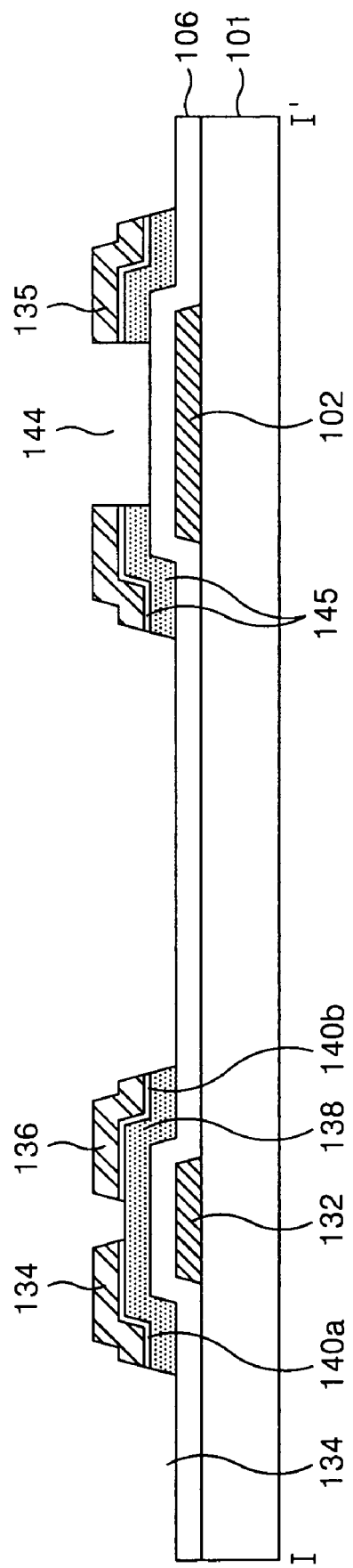
FIG. 6 is the cross-sectional diagram of the fabricating steps for a spacer well using a half-tone mask according to another embodiment of the present invention.

FIG. 6 is the cross-sectional diagram of the fabricating steps for a spacer well using a half-tone mask according to another embodiment of the present invention. As shown in FIG. 6, the source and drain electrode 134 and 136 have the same cross-sectional shape as the ohmic contact layer 140. Further, the dummy source/drain electrode pattern 135 has the same cross-sectional shape as the dummy semiconductor pattern 145.

Figure 7:
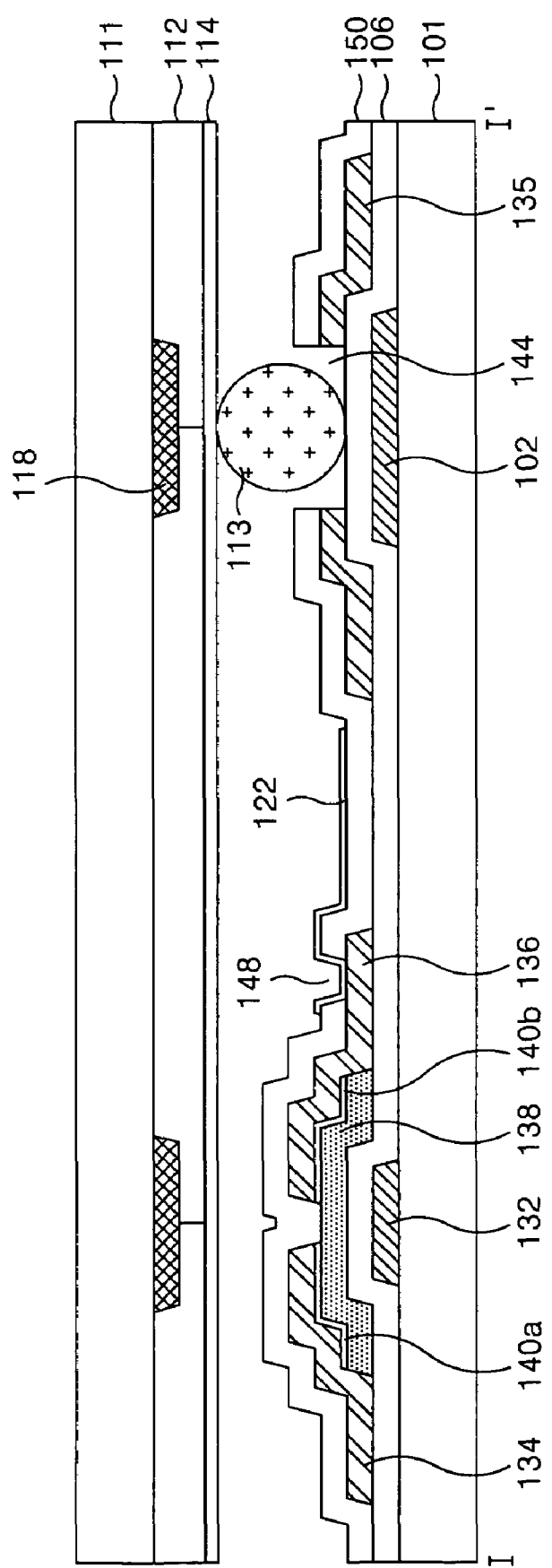
FIG. 7 is the cross-sectional diagrams representing the fabricating steps for a spacer well using the dummy source/drain electrode pattern without the dummy semiconductor pattern according to yet another embodiment of the present invention.

FIG. 7 is the cross-sectional diagrams representing the fabricating steps for a spacer well using the dummy source/drain electrode pattern without the dummy semiconductor pattern according to yet another embodiment of the present invention. As shown in FIG. 7, the spacer well 144 can be just formed of only the dummy source/drain electrode pattern 135 without the dummy semiconductor pattern 145. In the second mask process of the five mask process for forming the active layer 138 and the ohmic contact layer 140, the dummy semiconductor pattern 145 is not formed. After that, in the third mask process for forming the source and drain electrodes 134 and 136, the dummy source/drain electrode pattern 135 is also formed. As a result, the spacer well 144 is formed as shown in FIG. 7.

The above described embodiments of the present invention pertain to liquid crystal display panels having the common electrode 114 on the upper substrate. However, the present invention can be applied to a liquid crystal display panel in which the common electrode 114 is formed on the lower substrate to form a horizontal electric field with the pixel electrode 122.

As described above, the liquid crystal display panel and the fabricating method thereof according to embodiments of the present invention includes a spacer well that is formed by the dummy semiconductor pattern and the dummy source/drain electrode pattern overlapping the dummy semiconductor pattern to house or retain the ball spacer therewithin. Accordingly, the ball spacer does not move about the liquid crystal display even if the liquid crystal display panel is impacted during the manufacturing process. As a result, it is possible to prevent the light leakage and the reduction of the aperture ratio of the liquid crystal display panel caused by a ball spacer being moved from the black matrix area into the pixel area.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
   an upper substrate;
   a lower substrate facing the upper substrate;
   a gate line and a data line on an upper surface of the lower substrate facing the upper substrate, the gate line and the data line cross each other to define a cell area;
   a pixel electrode formed in the cell area;
   a dummy source/drain electrode pattern over the gate line; and
   a ball spacer within the dummy source/drain electrode pattern, the ball spacer maintaining a cell gap between the upper substrate and the lower substrate.

2. The liquid crystal display panel according to claim 1, further comprising a thin film transistor including:
   a gate electrode connected to the gate line
   an active layer over the gate electrode;
   first and second ohmic contact layers on the active layer;

a source electrode on the first ohmic contact layer and connected to the data line; and a drain electrode on the second ohmic contact layer and connected to the pixel electrode.

3. The liquid crystal display panel according to claim 2, wherein the dummy source/drain electrode pattern is formed of the same material as the source electrode and the drain electrode of the thin film transistor.

4. The liquid crystal display panel according to claim 2, further comprising a dummy semiconductor pattern between the dummy source/drain electrode pattern and the gate line.

5. The liquid crystal display panel according to claim 4, wherein the dummy source/drain electrode pattern and the dummy semiconductor pattern have the same shape.

6. The liquid crystal display panel according to claim 1, further comprising a common electrode formed on the lower substrate.

7. The liquid crystal display panel according to claim 1, further comprising a common electrode formed on the upper substrate.

8. A liquid crystal display panel, comprising:
an upper substrate;
a lower substrate facing the upper substrate;
a gate line and a data line on an upper surface of the lower substrate facing the upper substrate, the gate line and the data line cross each other to define a cell area;
a pixel electrode formed in the cell area;
a dummy semiconductor pattern over the gate line; and
a ball spacer within the dummy semiconductor pattern, the ball spacer maintaining a cell gap between the upper substrate and the lower substrate.

9. The liquid crystal display panel according to claim 8, further comprising a thin film transistor including:
a gate electrode connected to the gate line;
an active layer over the gate electrode;
first and second ohmic contact layers on the active layer;
a source electrode on the first ohmic contact layer and connected to the data line; and
a drain electrode on the second ohmic contact layer and connected to the pixel electrode.

10. The liquid crystal display panel according to claim 9, wherein the dummy semiconductor pattern is formed of the same materials as the first and second ohmic contact layers, and the active layer of the thin film transistor.

11. The liquid crystal display panel according to claim 8, further comprising a common electrode formed on the lower substrate.

12. The liquid crystal display panel according to claim 8, further comprising a common electrode formed on the upper substrate.

13. A fabricating method of a liquid crystal display panel, comprising:

forming a gate line on a lower substrate;
forming a data line crossing the gate line, and a first dummy pattern on the gate line;
forming a pixel electrode in a pixel area defined by the crossing of the gate line and the data line;
depositing a ball spacer within the first dummy pattern; and
providing an upper substrate facing the upper substrate;
bonding an upper substrate to the lower substrate.

14. The fabricating method according to claim 13, further comprising:
forming a gate electrode connected to the gate line;
forming an active layer over the gate electrode;
forming first and second ohmic contact layers on the active layer;
forming a source electrode on the first ohmic contact layer; and
forming a drain electrode on the second ohmic contact layer.

15. The fabricating method according to claim 14, wherein the first dummy pattern is formed of the same material as the source electrode and the drain electrode.

16. The fabricating method according to claim 15, wherein the first dummy pattern is formed at the same time as the source electrode and the drain electrode.

17. The fabricating method according to claim 14, wherein the first dummy pattern is formed of the same material as the first and second ohmic contact layers, and the active layer.

18. The fabricating method according to claim 14, wherein the first dummy pattern is formed at the same time as the first and second ohmic contact layers, and the active layer.

19. The fabricating method according to claim 14, further comprising:
forming a second dummy pattern between the first dummy pattern and the gate line.

20. The fabricating method according to claim 19, wherein the second dummy pattern is formed of the same material as the first and second ohmic contact layers, and the active layer.

21. The fabricating method according to claim 20, wherein the second dummy pattern is formed at the same time as the first and second ohmic contact layers, and the active layer of.

22. The fabricating method according to claim 19, wherein the first dummy pattern and the second dummy pattern are formed in the same mask processing step.

23. The fabricating method according to claim 22, wherein the mask processing step uses a half-tone mask.

24. The fabricating method according to claim 13, further comprising:
forming a common electrode on the lower substrate.

25. The fabricating method according to claim 13, further comprising:
forming a common electrode on the upper substrate.

* * * * *